(12) United States Patent
Nakayama

(10) Patent No.: US 12,484,488 B2
(45) Date of Patent: Dec. 2, 2025

(54) SEEDLING POT

(71) Applicant: CANROCK Co., Ltd., Tokyo (JP)

(72) Inventor: Yoshio Nakayama, Tokyo (JP)

(73) Assignee: CANROCK Co., Ltd., Tokyo (JP)

( * ) Notice: Subject to any disclaimer, the term of this patent is extended or adjusted under 35 U.S.C. 154(b) by 0 days.

(21) Appl. No.: 19/039,783

(22) Filed: Jan. 29, 2025

(65) Prior Publication Data

US 2025/0169401 A1 May 29, 2025

Related U.S. Application Data

(63) Continuation of application No. PCT/JP2023/039788, filed on Oct. 27, 2023.

(30) Foreign Application Priority Data

Nov. 10, 2022 (JP) .................................. 2022-180052

(51) Int. Cl.
*A01G 9/02* (2018.01)
*A01G 9/029* (2018.01)

(52) U.S. Cl.
CPC ............. *A01G 9/029* (2018.02); *A01G 9/021* (2013.01); *A01G 9/026* (2013.01)

(58) Field of Classification Search
CPC ........... A01G 9/029; A01G 9/026; A01G 9/02
See application file for complete search history.

(56) References Cited

U.S. PATENT DOCUMENTS 4,439,950 A * 4/1984 Kelley ................... A01G 9/029
47/85
2011/0135856 A1 6/2011 Bell et al.

FOREIGN PATENT DOCUMENTS

| JP | S49-43450 U | 4/1974 |
| JP | H08-322394 A | 12/1996 |
| JP | 2004-298053 A | 10/2004 |
| JP | 2022-1030 A | 1/2022 |
| JP | 2022001030 A * | 1/2022 |

OTHER PUBLICATIONS

International Search Report for PCT/JP2023/039788 dated Dec. 19, 2023.
PCT written opinion dated Dec. 19, 2023.

* cited by examiner

*Primary Examiner* — Kristen C Hayes
(74) *Attorney, Agent, or Firm* — Yokoi & Co., U.S.A.; Toshiyuki Yokoi

(57) ABSTRACT

One or more slit 14 extending from a free end 13 to an end portion 11 of a folded portion 10 is formed in a tongue piece portion 12 of a pot body, an intermediate portion of each of sides 6 of an opening end portion 3 is bendable in a direction opposite to a center O of the opening end portion 3 at a position of the slit 14 and a base portion of the end portion 11, and an additional vertex 5a is formed at a bent portion in addition to vertices 5 of a polygon of the opening end portion 3 when the intermediate portion of each of the sides 6 of the opening end portion 3 is bent.

5 Claims, 7 Drawing Sheets

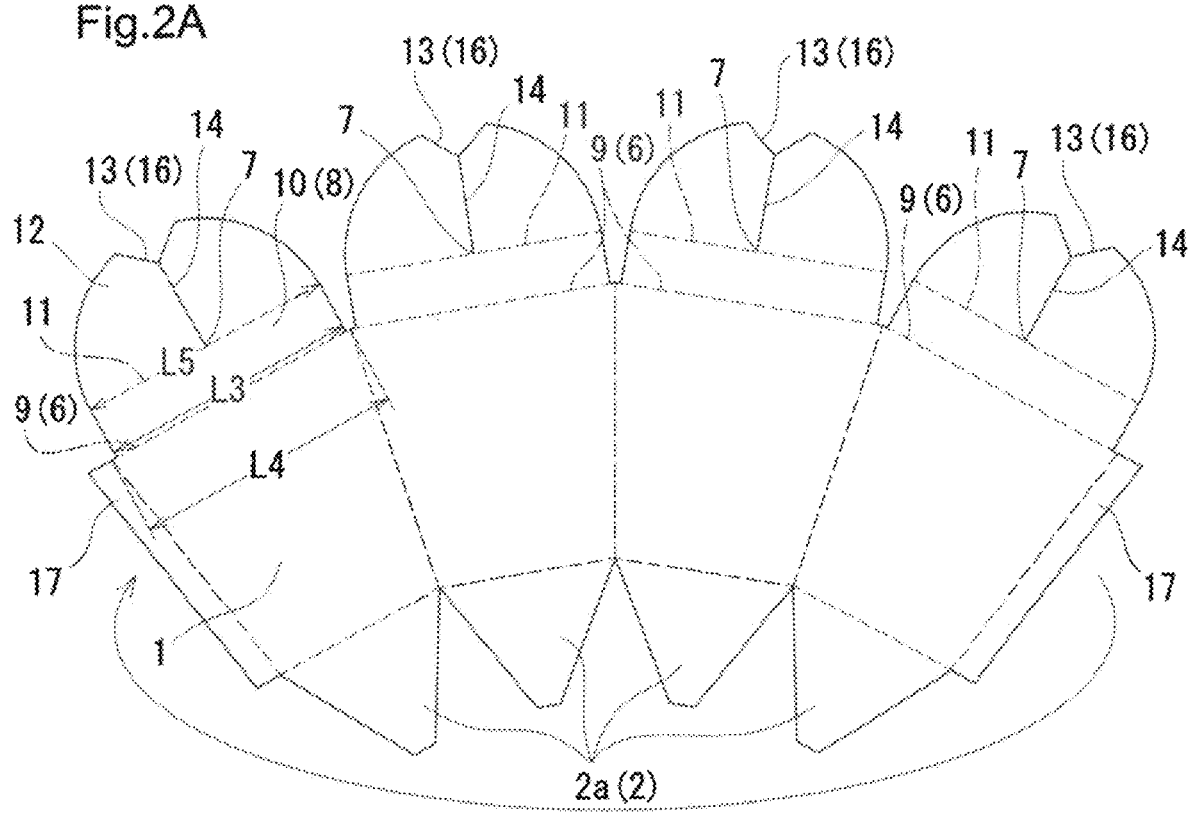
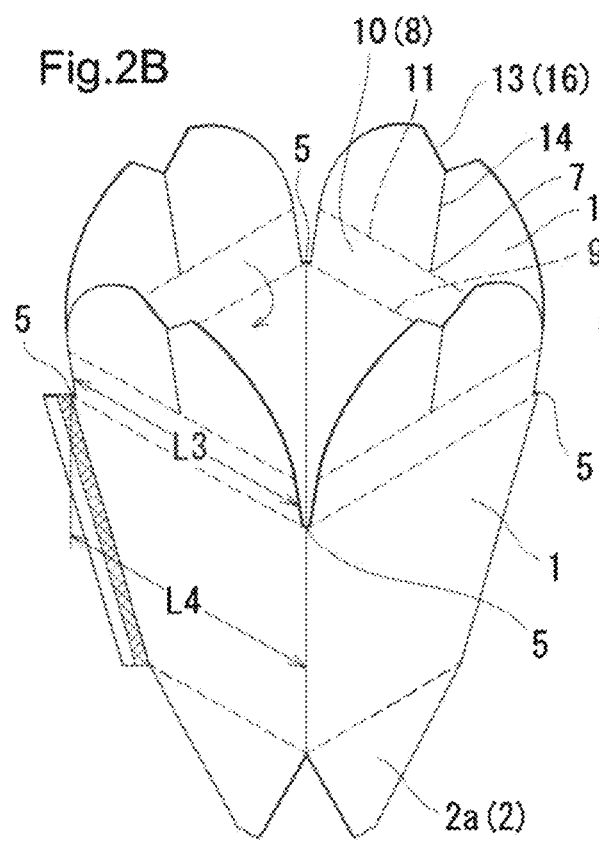
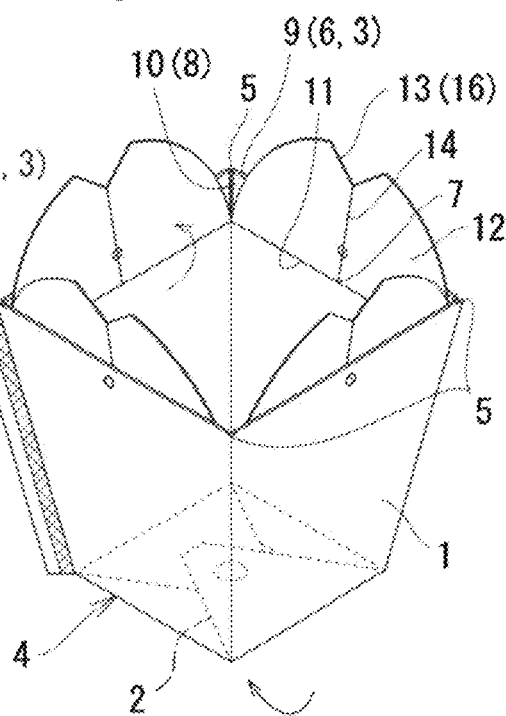

L2>L1

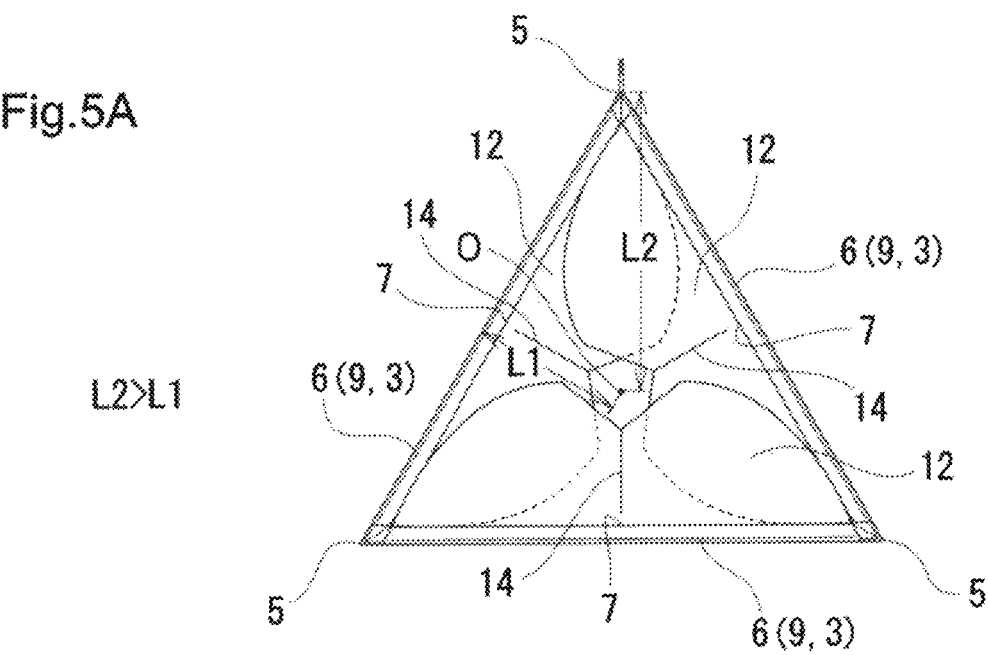
Fig.5A  L2>L1
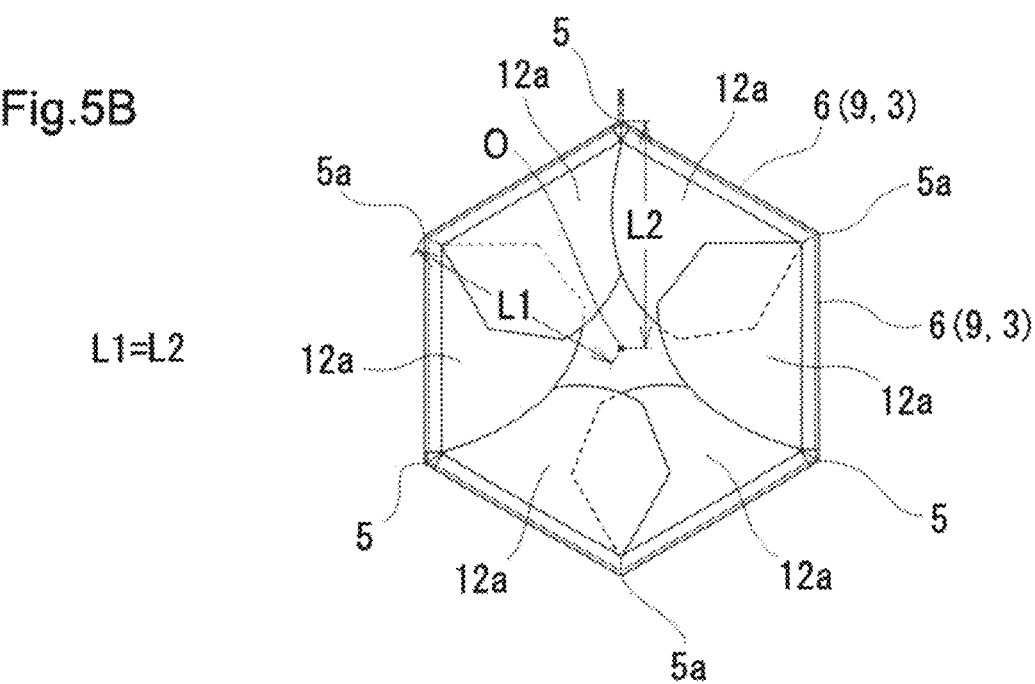
Fig.5B  L1=L2

SEEDLING POT

CROSS-REFERENCE TO RELATED APPLICATIONS

This Application claims the benefit of priority and is a Continuation application of the prior International Patent Application No. PCT/JP2023/039788, with an international filing date of Oct. 27, 2023, which designated the United States, and is related to the Japanese Patent Application No. 2022-180052, filed Nov. 10, 2022, the entire disclosures of all applications are expressly incorporated by reference in their entirety herein.

TECHNICAL FIELD

The present invention relates to a seedling pot.

BACKGROUND OF THE INVENTION

In a seedling pot disclosed in Patent Document 1, a bottom portion, a peripheral surface portion and a lid portion are integrally formed. In Patent Document 1, the lid portion is formed by a plurality of tongue piece portions and the tongue piece portions are crossed and overlapped with each other to cover an upper portion of the seedling pot. In addition, since the crossed and overlapped portions of the tongue piece portions can be easily separated from each other, a seedling pot having excellent operability can be provided.

PRIOR ART

Patent Documents

Patent Document 1: Japanese Patent Application Publication No. 2022-1030

SUMMARY OF THE INVENTION

Problem to be Solved by the Invention

Conventionally, it is necessary to prepare seedling pots having different sizes and shapes according to the size and shape of the seedlings. Therefore, the manufacturing cost of the seedling pot is high and the management is complicated. In particular, it is difficult to change the shape of an opening end portion of the seedling pot. The present invention aims to provide a seedling pot that resolves the above described problem.

Means for Solving the Problems

The first invention for solving the above described problem is a seedling pot comprised of a pot body 4 including: a peripheral surface portion 1 having a tubular shape with a polygonal shape in a plan view; a bottom portion 2 that closes a lower end side of the peripheral surface portion 1; and an opening end portion 3 that is opened at an upper end side of the peripheral surface portion 1, wherein a folded portion 10 is formed on each of sides 6 of a polygon located at a periphery of the opening end portion 3, the folded portion 10 is fixed in a state that the folded portion 10 is folded back from an upper edge 9 of the opening end portion 3 toward the bottom portion 2 on an inside or an outside of the peripheral surface portion 1, a tip of the folded portion 10 is a free end 10a, one or more slit 14 or cutting line 15 extending from the free end 10a to the upper edge 9 is formed in the folded portion 10, an intermediate portion of each of the sides 6 of the opening end portion 3 is bendable in a direction opposite to a center O of the opening end portion 3 at a position of the slit 14 or the cutting line 15, and an additional vertex 5a is formed at a bent portion in addition to vertices 5 of the polygon of the opening end portion 3 when the intermediate portion of each of the sides 6 of the opening end portion 3 is bent.

The second invention for solving the above described problem is a seedling pot comprised of a pot body 4 including: a peripheral surface portion 1 having a tubular shape with a polygonal shape in a plan view; a bottom portion 2 that closes a lower end side of the peripheral surface portion 1; and an opening end portion 3 that is opened at an upper end side of the peripheral surface portion 1, wherein a folded portion 10 is formed on each of sides 6 of a polygon located at a periphery of the opening end portion 3, the folded portion 10 is fixed in a state that the folded portion 10 is folded back from an upper edge 9 of the opening end portion 3 toward the bottom portion 2 on an inside of the peripheral surface portion 1, a tongue piece portion 12 is formed on an end portion 11 of the folded portion 10, a tip of the tongue piece portion 12 is a free end 13, one or more slit 14 or cutting line 15 extending from the free end 13 to the end portion 11 of the folded portion 10 is formed in the tongue piece portion 12, an intermediate portion of each of the sides 6 of the opening end portion 3 is bendable in a direction opposite to a center O of the opening end portion 3 at a position of the slit 14 or the cutting line 15 and a base portion of the end portion 11, and an additional vertex 5a is formed at a bent portion in addition to vertices 5 of the polygon of the opening end portion 3 when the intermediate portion of each of the sides 6 of the opening end portion 3 is bent.

The third invention for solving the above described problem is the seedling pot according to the second invention, wherein divided tongue piece portions 12a are formed by dividing a tongue piece portion 12 by the slit 14, and when the intermediate portion of each of the sides 6 of the opening end portion 3 is bent, a tip of each of the divided tongue piece portions 12 is extended toward the center O of the opening end portion 3 and the divided tongue piece portions 12a are partially crossed and overwrapped with each other.

The fourth invention for solving the above described problem is the seedling pot according to the first invention or the second invention, wherein a length L3 of the folded portion 10 is approximately same as a length L4 of each of the sides 6 of the polygon.

The fifth invention for solving the above described problem is the seedling pot according to the first invention or the second invention, wherein a length from the center O of the pot body 4 in the opening end portion 3 to the intermediate portion of each of the sides 6 of the polygon located at the periphery of the opening end portion 3 is L1, the pot body 4 is configured to be switched between a first state and a second state, the length L1 is not extended in the first state, the length L1 is configured to be extended by bending the sides 6 of the opening end portion 3 to form the additional vertex 5a at an intermediate portion of the sides 6 in the second state in addition to the vertices 5 of the polygon in the first state, and one or more variable portion 7 is provided in the intermediate portion so that the one or more variable portion 7 becomes the additional vertex 5a in the second state for extending the length L1, and the first state can be switched to the second state where the additional vertex 5a is formed by cutting the slit 14 or the cutting line 15 to the variable portions 7 in the first state for extending the length L1.

Effects of the Invention

In the seedling pot of the first invention, one or more slit 14 or cutting line 15 extending from the free end 10*a* to the upper edge 9 is formed in the folded portion 10, an intermediate portion of each of the sides 6 of the opening end portion 3 is bendable in a direction opposite to a center O of the opening end portion 3 at a position of the slit 14 or the cutting line 15, and an additional vertex 5*a* is formed at a bent portion in addition to vertexes 5 of the polygon of the opening end portion 3 when the intermediate portion of each of the sides 6 of the opening end portion 3 is bent. When the above described configuration is adopted, the shape of the opening end portion 3 of the pot body 4 can be changed in accordance with the position of the slit 14 or the cutting line 15. Therefore, various sizes of seedlings can be accommodated to some extent by one type of seedling pot. Thus, the manufacturing cost can be reduced. In addition, since the number of types of seedling pots to be manufactured decreases, the management becomes easier.

In the seedling pot of the second invention, one or more slit 14 or cutting line 15 extending from the free end 13 to the end portion 11 of the folded portion 10 is formed in the tongue piece portion 12, an intermediate portion of each of the sides 6 of the opening end portion 3 is bendable in a direction opposite to a center O of the opening end portion 3 at a position of the slit 14 or the cutting line 15 and a base portion of the end portion 11, and an additional vertex 5*a* is formed at a bent portion in addition to vertices 5 of the polygon of the opening end portion 3 when the intermediate portion of each of the sides 6 of the opening end portion 3 is bent. When the above described configuration is adopted, similar to the first invention, the shape of the opening end portion 3 of the pot body 4 can be changed in accordance with the position of the slit 14 or the cutting line 15.

In the seedling pot of the third invention, divided tongue piece portions 12*a* are formed by dividing a tongue piece portion 12 by the slit 14, and when the intermediate portion of each of the sides 6 of the opening end portion 3 is bent, a tip of each of the divided tongue piece portions 12 is extended toward the center O of the opening end portion 3 and the divided tongue piece portions 12*a* are partially crossed and overwrapped with each other in the seedling pot of the second invention. When the above described configuration is adopted, floating is reduced compared to the case where not divided tongue piece portions 12 are crossed and overlapped with each other. Thus, curling up of the divided tongue piece portions 12*a* can be prevented and the weed prevention effect of the divided tongue piece portions 12*a* can be improved.

In the fourth invention, a length L3 of the folded portion 10 is approximately same as a length L4 of each of the sides 6 of the polygon. When the above described configuration is adopted, the total length L3 of the folded portion 10 in the direction of extending each of the sides 6 is approximately same as the length L4 of each of the sides 6 of the polygon. Thus, the shape of the opening end portion 3 before the intermediate portion of each of the sides 6 is bent can be maintained sufficiently. Even with the configuration of the fifth invention, the effects of the first invention or the second invention can be obtained.

BRIEF DESCRIPTION OF DRAWINGS

FIG. 1A is a perspective view and FIG. 1B is a perspective view of the use state.

FIGS. 2A to 2C show the seedling pot in the first embodiment of the present invention. FIG. 2A is a development view of the seedling pot, FIG. 2B shows a bending process of the tongue piece portion 12, and FIG. 2C is a perspective view of a pot body 4 in an assembled state.

FIG. 3A is a plan view, FIG. 3B is a perspective view, and FIG. 3C is a bottom view.

FIG. 4A is a plan view, FIG. 4B is a perspective view, and FIG. 4C is a bottom view.

FIGS. 5A and 5B show the seedling pot in the second embodiment of the present invention. FIG. 5A is a plan view of the first state, and FIG. 5B is a plan view of the second state.

FIG. 6A is a development view of the seedling pot, FIG. 6B shows a bending process of the folded portions 10, and FIG. 6C is a perspective view of the pot body 4 in an assembled state.

FIG. 7A shows a plan view of the first state, and FIG. 7B is a plan view of the second state.

DETAILED DESCRIPTION OF THE INVENTION

The pot body 4 of the seedling pot of the present invention includes a peripheral surface portion 1 having a tubular shape with a polygonal shape (polygonal cross-section) in a plan view; a bottom portion 2 that closes a lower end side of the peripheral surface portion 1; and an opening end portion 3 that is opened at an upper end side of the peripheral surface portion 1. The peripheral surface portion 1, the bottom portion 2 and the opening end portion 3 are integrally formed from the same material. A material having flexibility is suitable for the material of the seedling pot. As an example, a nonwoven fabric having a light shielding property can be used. Materials such as paper can be used instead as long as it can be processed relatively easy.

Next, the embodiments of the present invention will be explained based on the drawings.

First Embodiment

Figure 1A:
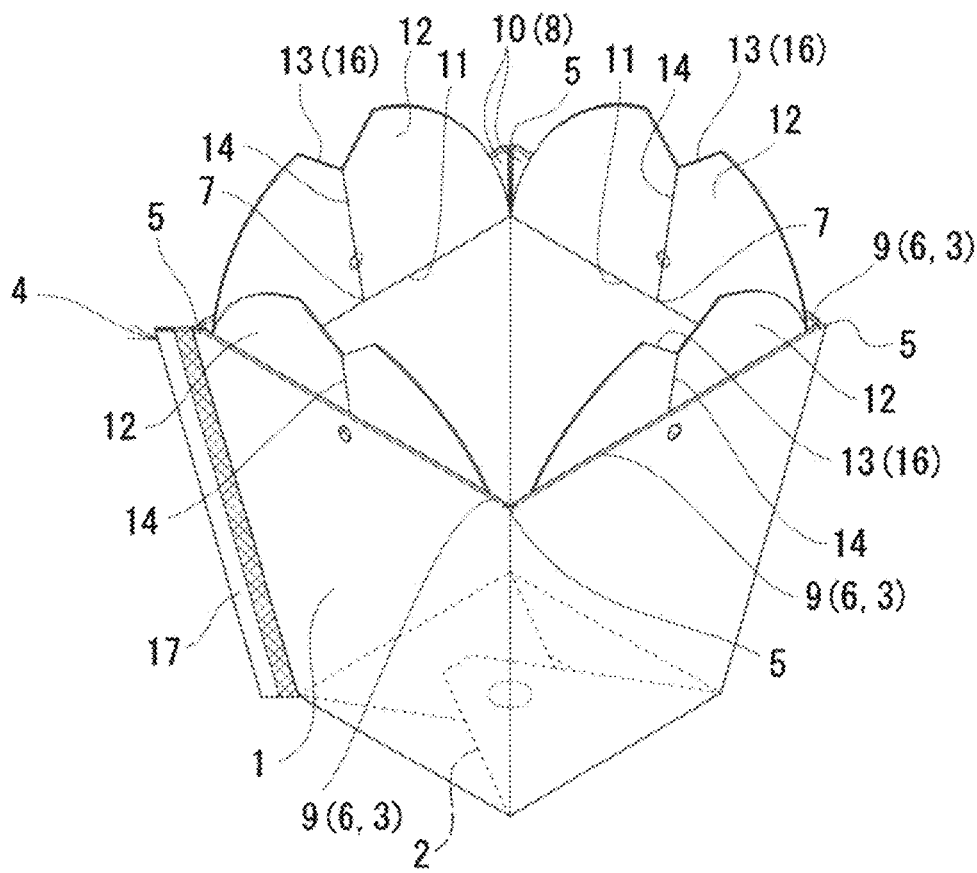
FIGS. 1A and 1B show the shape of the first state of a seedling pot in the first embodiment of the present invention.

FIG. 1A, FIG. 1B and FIG. 3A to FIG. 3C show the shape of the first state in the first embodiment. FIG. 2A to FIG. 2C show the development state and the manufacturing process of the first embodiment. As shown in FIG. 1A, the seedling pot has the peripheral surface portion 1 having a tubular shape formed in a square shape in a plan view. The lower end side of the peripheral surface portion 1 is closed by the bottom portion 2. The upper end side of the peripheral surface portion 1 is opened as the opening end portion 3. The folded portions 10 are formed on each of the sides 6 of the polygon located at the periphery of the opening end portion 3. The folded portions 10 are fixed in a state that the folded portions 10 are folded back from an upper edge 9 of the opening end portion 3 toward the bottom portion 2 on an inside of the peripheral surface portion 1. The tongue piece portion 12 is formed on the end portion 11 of each of the folded portions 10. A tip of the tongue piece portion 12 is formed as the free end 13. A slit 14 extending from the free end 13 of the tongue piece portion 12 to the end portion 11 of the folded portion 10 is formed in the tongue piece portion 12. As described in FIG. 1A to FIG. 3C, the slit 14 of the first embodiment is formed from the free end 13 of the tongue piece portion 12 to the end portion 11 of the folded portion 10. An intermediate portion of each of the sides 6 of the opening end portion 3 is bendable in a direction opposite to a center O of the opening end portion 3 at a position of the slit 14 and a base portion of the end portion 11. The variable portions 7 are formed at a bendable portion (bent portion) so that the variable portions 7 function as additional vertices 5a.

Figure 3A:
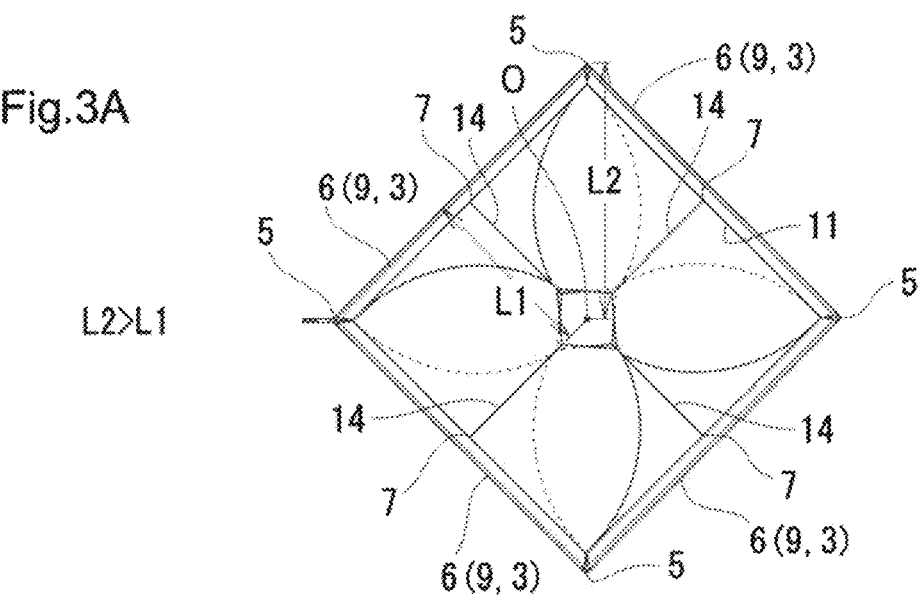
FIGS. 3A to 3C show the first state in the first embodiment of the present invention.
Figure 3B:
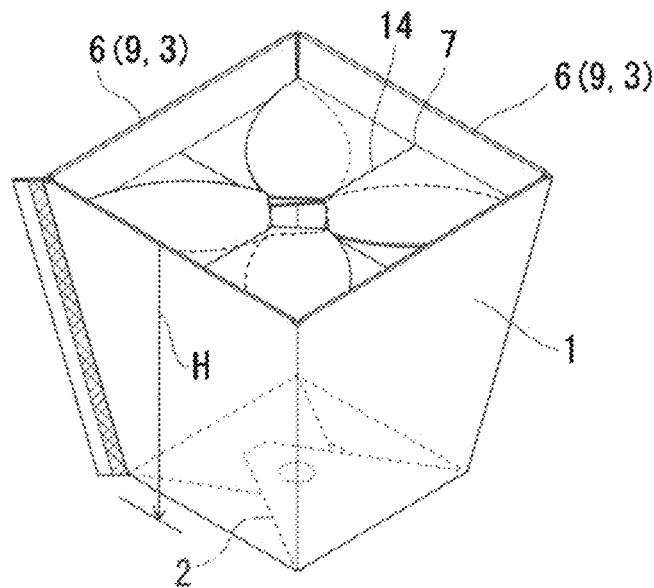
Figure 3C:
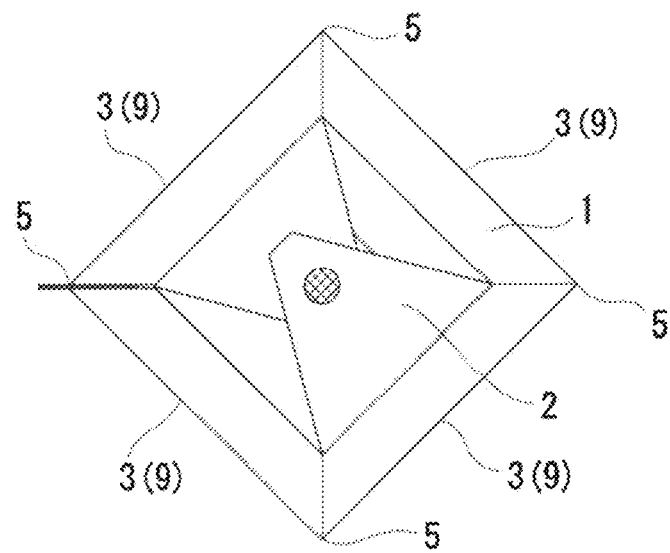

In other words, when a length from the center O of the pot body 4 in the opening end portion 3 to the intermediate portion of each of the sides 6 of the polygon located at the periphery of the opening end portion 3 is L1 (hereafter, referred to as length L1). The pot body 4 is configured to be switched between a first state shown in FIGS. 3A to 3C and a second state shown in FIGS. 4A to 4C. The length L1 is not extended in the first state. The length L1 is extended in the second state where the additional vertex 5a is formed at an intermediate portion of each of the sides 6 in addition to the vertices 5 of the polygon in the first state. The variable portion 7 is formed on the intermediate portion of each of the sides 6 of the opening end portion 3 so that the variable portion 7 functions as the additional vertex 5a for extending the length L1 in the second state. As shown in FIG. 3A, the length L is not extended in the first state and the length L1 is shorter than the length L2 from the center O of the pot body 4 in the opening end portion 3 to the vertices 5 of the polygon located at the periphery of the opening end portion 3 (hereafter, referred to as length L2).

Figure 1B:
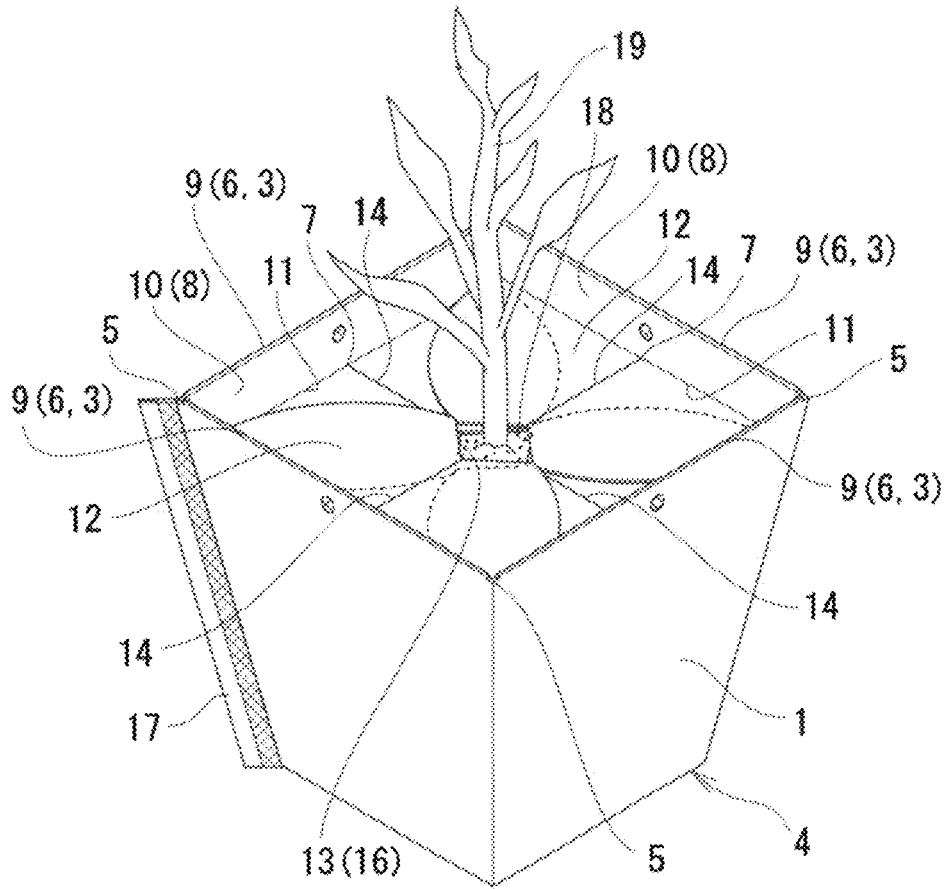

In the seedling pot in the first embodiment, as shown in the development view of FIG. 2A, the bottom portion 2, the peripheral surface portion 1, the folded portions 10 and the tongue piece portion 12 of the seedling pot are integrally formed by a single pattern. The seedling pot is formed in the order of FIG. 2B and FIG. 2C. As shown in FIG. 2B, each of the folded portions 10 is folded toward the bottom portion 2 on the inside of the peripheral surface portion 1 and bonded to the inner surface of the peripheral surface portion 1. Then, as shown in FIG. 2C, the tips of the tongue piece portions 12 are folded upward from the position of the end portion 11 of each of the folded portions 10 toward the upper side of the pot body 4. Each of the tongue piece portions 12 is temporarily fixed to each of the folded portions 10. As shown in the development view of FIG. 2A, as for the length L3 of the folded portion 10 (hereafter, referred to as length L3) and the length L4 of each of the sides 6 of the polygon of the opening end portion 3 (hereafter, referred to as L4), it is preferred that the length L3 is slightly shorter than the length L4. The length L5 of the longest portion of the tongue piece portion 12 formed on the end portion 11 of the folded portion 10 is preferably same as the length L3. In the first embodiment, as shown in FIG. 1A and FIG. 2A, the tongue piece portion 12 is formed in a semicircular shape from the end portion 11 of the folded portion 10. The tip of the tongue piece portion 12 is a notched portion 16 which is forked into two. However, the shape of the tongue piece portion 12 is not limited to the above described shape. When using the pot body 4 in an unbent state (first state), as shown in FIG. 1B, each of the temporarily fixed tongue piece portions 12 is pulled back to cover the surface of the culture soil 18 and parts of adjacent tongue piece portions 12 are sequentially overlapped while crossing to form a lid covering the culture soil 18.

Figure 4A:
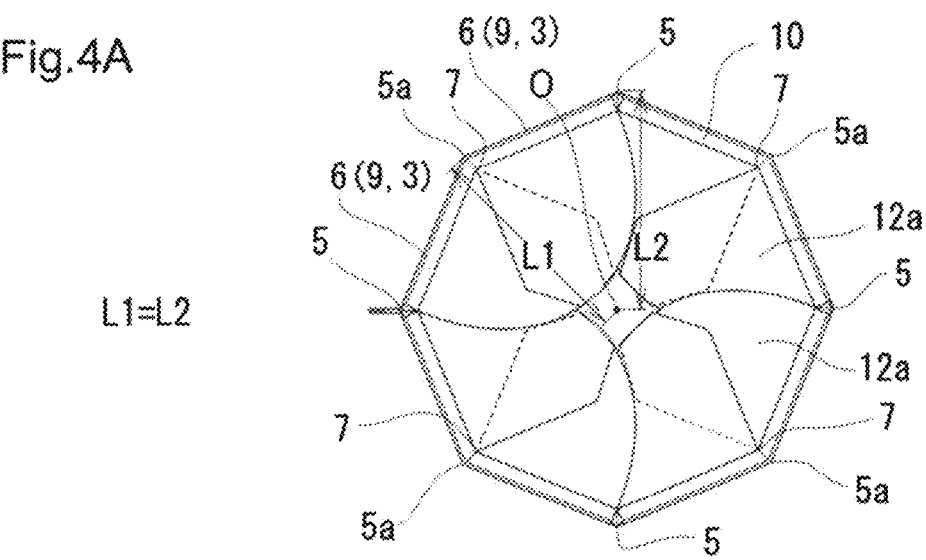
FIGS. 4A to 4C show the second state in the first embodiment of the present invention.
Figure 4B:
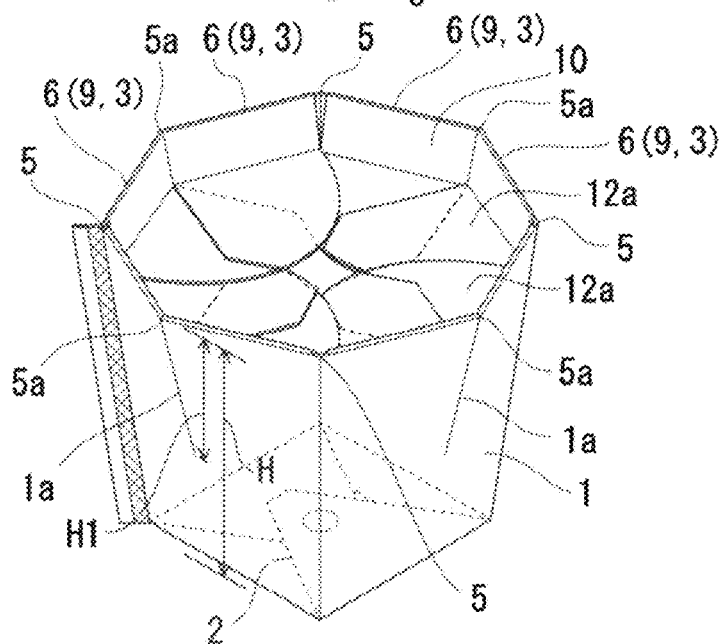
Figure 4C:
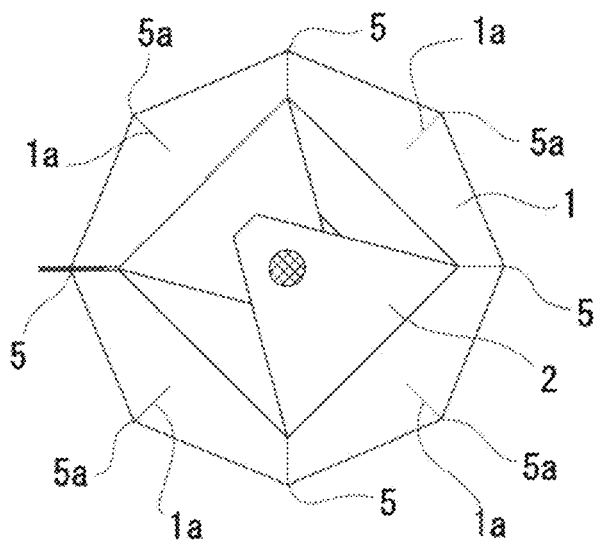
Figure 6A:
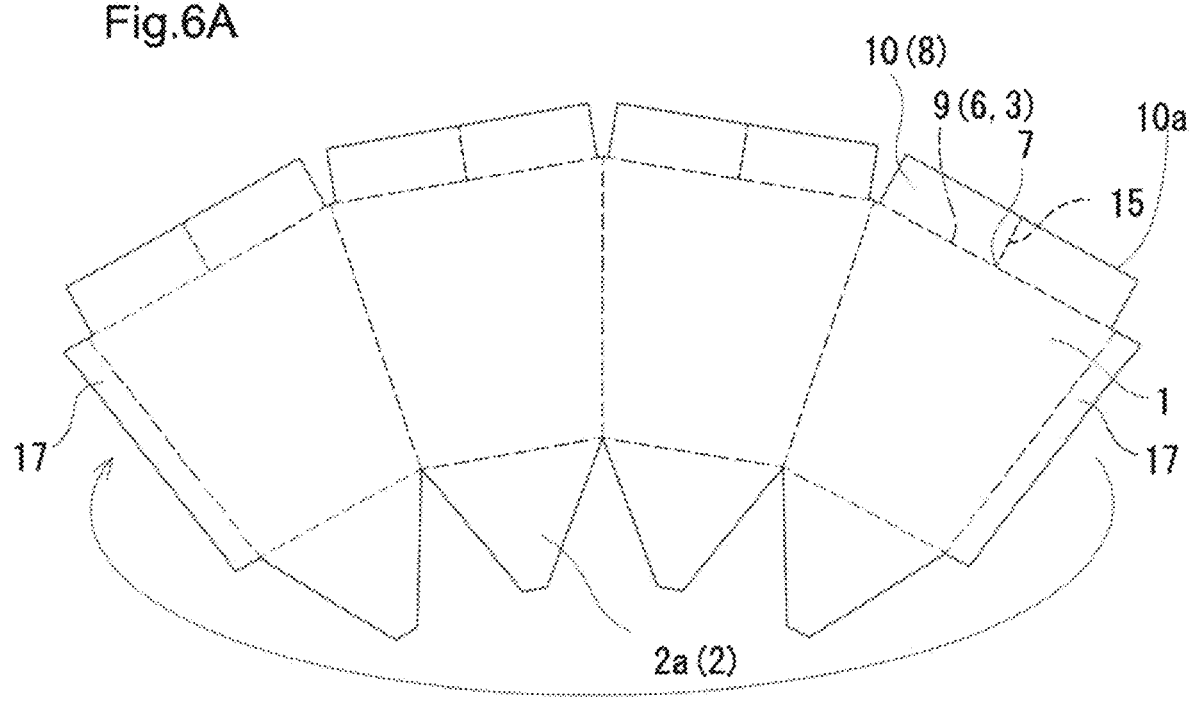
FIGS. 6A to 6C show the seedling pot in the third embodiment of the present invention.
Figure 6B:
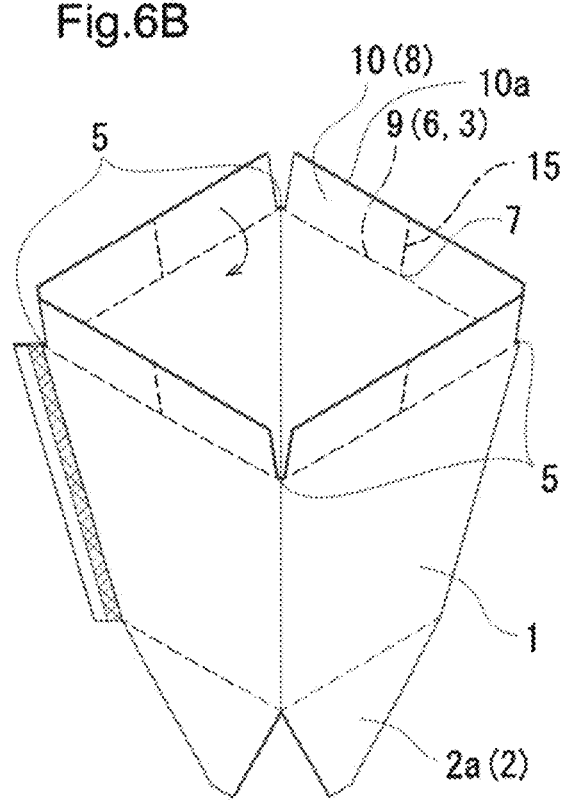
Figure 6C:
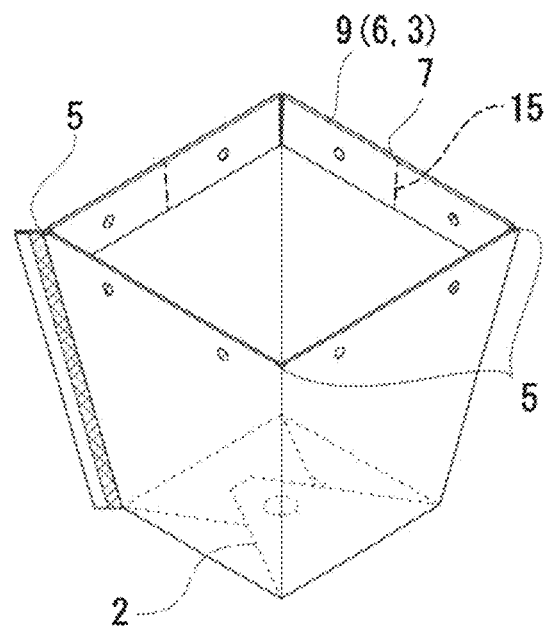

FIG. 4A to 4C show the second state of the seedling pot in the first embodiment (the state where the intermediate portion of each of the sides 6 of the opening end portion 3 is bent). In the second state, the additional vertices 5a are formed at the bent portions in addition to the vertices 5 of the polygon of the opening end portion 3. In other words, the length L1 is extended and the additional vertex 5a is formed at the position of the variable portions 7 in the first state. The folded portion 10 is bent at the position of the additional vertices 5a of the opening end portion 3 and the other portions maintain the shape of the opening end portion 3 in the second state. In the second state of the first embodiment, the divided tongue piece portions 12a are provided by dividing the tongue piece portions 12 by the slits 14. Parts of each of the divided tongue piece portions 12a is crossed and overlapped with each other and the state shown in FIG. 4A is formed. When the parts of each of the divided tongue piece portions 12a are crossed and overlapped with each other, the floating is reduced compared to the case where not divided tongue piece portions 12 are crossed and overlapped with each other. Thus, curling up of the divided tongue piece portions 12a covering the upper part of the culture soil can be prevented and the weed prevention effect of the divided tongue piece portions 12a can be improved. In addition, since there is no floating of the tongue piece portions 12, the aesthetic appearance of the overlapped state of the divided tongue piece portions 12a is improved. In the second state of the first embodiment, the shape of the opening end portion 3 is octagonal in a plan view while the shape of the bottom portion 2 is square in the plan view. In the second state, as shown in FIG. 4B, the additional vertices 5a are formed and a peripheral wall expansion portions 1a reflecting the additional vertices 5a are formed on the peripheral surface portion 1 of the pot body 4.

Second Embodiment

FIGS. 5A and 5B show the second embodiment of the present invention. In the second embodiment, the slit 14 is formed from the free end 13 of the tongue piece portion 12 up to the end portion 11 of the folded portion 10 in the first state. When changing from the first state to the second state, the slit 14 formed from the free end 13 of the tongue piece portion 12 up to the end portion 11 of the folded portion 10 in the first state is extended by cutting with scissors or similar tools to the position of the variable portions 7 at the end portions 11 of the folded portions 10. Consequently, the additional vertices 5a of the second state are formed at the position of the variable portions 7. In addition, the second embodiment is different from the first embodiment in that the opening end portion 3 of the pot body 4 is triangular in a plan view in the first state while the opening end portion 3 is hexagonal in a plan view in the second state. In the first state of the second embodiment, there are three tongue piece portions 12 and six divided tongue piece portions 12a are formed by the extended slits 14 in the second state. As described above, the present invention is applicable even when the opening end portion 3 of the pot body 4 has other polygonal shapes than the square shape without being limited to the square shape.

Third Embodiment

Figure 7A:
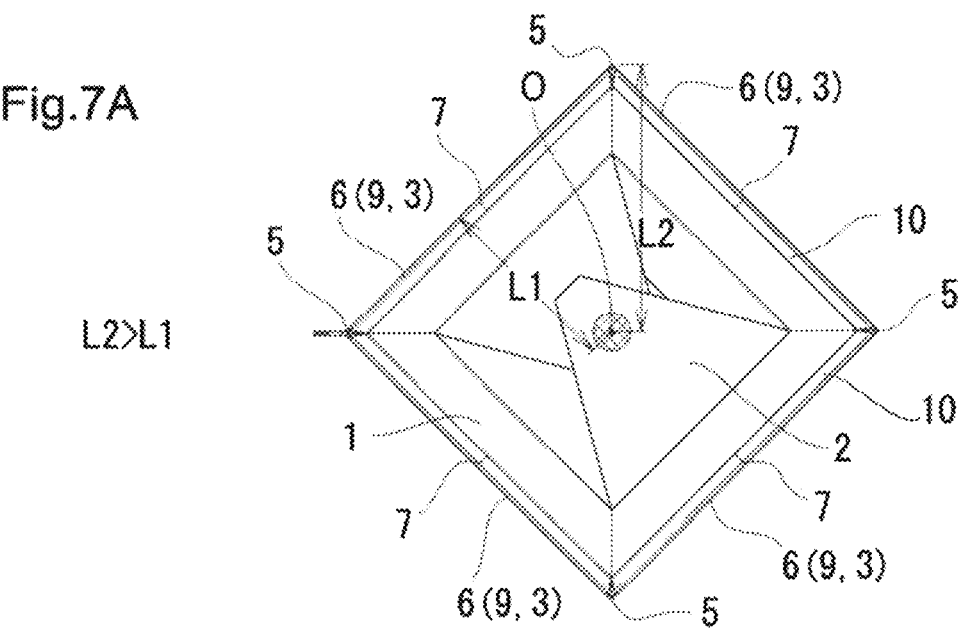
FIGS. 7A and 7B show the third embodiment of the present invention.
Figure 7B:
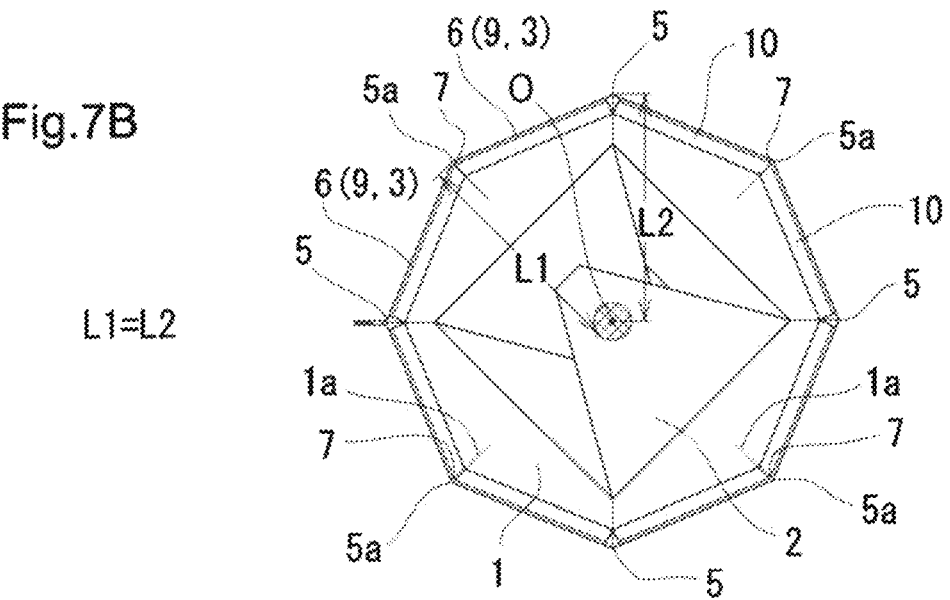

FIGS. 6A to 6C and FIGS. 7A and 7B show the third embodiment of the present invention. The third embodiment is different from the first embodiment in that the tongue piece portions 12 are eliminated. In the third embodiment, the folded portion 10 folded back from the upper edge 9 of the opening end portion 3 toward the bottom portion 2 on the inside of the peripheral surface portion 1 is formed as a rigid portion 8 and the tip of the folded portion 10 is formed as the free end 10*a*. In the second embodiment, a cutting line (cutting mark) 15 such as a perforation is formed instead of the slit 14 of the first embodiment and the second embodiment. The cutting line 15 is formed from the free end 10*a* of the folded portion 10 toward the upper edge 9. The variable portions 7 bendable in the direction opposite to the center O of the opening end portion 3 are provided on the intermediate portion of each of the sides 6 of the opening end portion 3 at the position of the cutting line 15. The cutting line 15 maintains the rigidity of the variable portion 7 and maintains the shape of the first state of the opening end portion 3 more easily than the slit 14. When changing from the first state to the second state, the cutting line 15 is separated from the free end 10*a* to the upper edge 9. As described above, even with the structure without the tongue piece portions 12, the shape of the opening end portion 3 can be changed from the first state to the second state as shown in FIG. 7B. In addition, the opening end portion 3 in the second state is bent at the position of the additional vertices 5*a* and the other portions to maintain the shape of the opening end portion 3 in the second state due to the rigidity of the folded portions 10. The folded portions 10 may also be folded back from the upper edge 9 of the opening end portion 3 toward the peripheral surface portion 1 on the outside of the bottom portion 2. In the above described structure, the cutting operation can be easily performed along the cutting line 15 for changing to the second state compared to the structure where the folded portion 10 is folded back on the inside of the pot body 4.

Other Embodiments

The notched portions 16 in the first embodiment and the second embodiment may be formed as needed. The slit 14 in the first embodiment and the second embodiment may be the cutting line 15 such as a perforation same as the third embodiment. The peripheral wall portion 1 of the pot body 4 in each embodiment is widened from the bottom portion 2 toward the opening end portion 3. However, in the first state, the peripheral wall portion 1 may also be formed without inclination. In the first embodiment or thee second embodiment, one slit 14 is formed at the center position in the width direction of each tongue piece portion 12. In the third embodiment, one cutting line 15 is formed at the center position in the width direction of each folded portion 10. The configuration of the slit 14 or the cutting line 15 is not limited to the above described configuration. It is possible to form a plurality of slits 14 or a plurality of cutting lines 15. In this case, the slits 14 or the cutting lines 15 should be formed to be spaced apart from each other. In the second state of these embodiments, it is preferable to form the additional vertices 5*a* on each of the sides 6 respectively. The configuration of the additional vertices 5*a* is not limited to the above described configuration. It is enough if the additional vertex 5*a* is formed on one or more sides 6.

Industrial Applicability

The present invention can be used as a seedling pot for growing seedlings of flowers, fruit trees and the like.

LIST OF REFERENCE NUMERALS

1: peripheral surface portion, 1*a*: peripheral wall expansion portion, 2: bottom portion, 2*a*: bottom tongue piece, 3: opening end portion, 4: pot body, 5: vertices, 5*a*: additional vertex, 6: edge, 7: variable portion, 8: rigid portion, 9: upper edge, 10: folded portion, 10*a*: free end, 11: end portion, 12: tongue piece portion, 12*a*: divided tongue piece portion, 13: free end, 14: slit, 15: cutting line, 16: notched portion, 17: connection margin, 18: culture soil, 19: seedling, O: center, H: total height of pot body 4, H1: height from opening end portion 3 to intermediate portion of pot body 4, L1: length from center O to intermediate portion of edge 6 of polygon at periphery of opening end portion 3, L2: length from center O to vertices 5 of polygon at periphery of opening end portion 3, L3: length of rigid portion 8, L4: length of edge 6 of polygon, L5: maximum width of tongue piece portion 12

The invention claimed is:

1. A seedling pot comprising a pot body including: a peripheral surface portion having a tubular shape with a polygonal shape in a plan view; a bottom portion that closes a lower end side of the peripheral surface portion; and an opening end portion that is opened at an upper end side of the peripheral surface portion, wherein
  a folded portion is formed on each of sides of a polygon located at a periphery of the opening end portion,
  the folded portion is fixed in a state that the folded portion is folded back from an upper edge of the opening end portion toward the bottom portion on an inside or an outside of the peripheral surface portion,
  a tip of the folded portion is a free end,
  one or more slit or cutting line extending from the free end to the upper edge is formed in the folded portion,
  an intermediate portion of each of the sides of the opening end portion is bendable in a direction opposite to a center of the opening end portion at a position of the slit or the cutting line, and
  an additional vertex is formed at a bent portion in addition to vertices of the polygon of the opening end portion when the intermediate portion of each of the sides of the opening end portion is bent.

2. A seedling pot comprising a pot body including: a peripheral surface portion having a tubular shape with a polygonal shape in a plan view; a bottom portion that closes a lower end side of the peripheral surface portion; and an opening end portion that is opened at an upper end side of the peripheral surface portion, wherein
  a folded portion is formed on each of sides of a polygon located at a periphery of the opening end portion,
  the folded portion is fixed in a state that the folded portion is folded back from an upper edge of the opening end portion toward the bottom portion on an inside of the peripheral surface portion,
  a tongue piece portion is formed on an end portion of the folded portion,
  a tip of the tongue piece portion is a free end,
  one or more slit or cutting line extending from the free end to the end portion of the folded portion is formed in the tongue piece portion,
  an intermediate portion of each of the sides of the opening end portion is bendable in a direction opposite to a center of the opening end portion at a position of the slit or the cutting line and a base portion of the end portion, and
  an additional vertex is formed at a bent portion in addition to vertices of the polygon of the opening end portion when the intermediate portion of each of the sides of the opening end portion is bent.

3. The seedling pot according to claim 2, wherein
divided tongue piece portions are formed by dividing a tongue piece portion by the slit, and
when the intermediate portion of each of the sides of the opening end portion is bent, a tip of each of the divided tongue piece portions is extended toward the center of the opening end portion and the divided tongue piece portions are partially crossed and overwrapped with each other.

4. The seedling pot according to claim 2, wherein
a first length of the folded portion is approximately same as a second length of each of the sides of the polygon.

5. The seedling pot according to claim 2, wherein
a length from the center of the pot body in the opening end portion to the intermediate portion of each of the sides of the polygon located at the periphery of the opening end portion is L1, the pot body is configured to be switched between a first state and a second state, the length L1 is not extended in the first state, the length L1 is configured to be extended by bending the sides of the opening end portion to form the additional vertex at an intermediate portion of each of the sides in the second state in addition to the vertices of the polygon in the first state, and one or more variable portion is provided in the intermediate portion so that the one or more variable portion becomes the additional vertex in the second state for extending the length L1, and the first state can be switched to the second state where the additional vertex is formed by cutting the slit or the cutting line to the variable portions in the first state for extending the length L1.

\* \* \* \* \*